A. G. W. FOSTER.
Meat-Tenderer.

No. 166,199.

2 Sheets--Sheet 1.

Patented Aug. 3, 1875.

WITNESSES.
Wm Garner
Chas. H Lemon

INVENTOR.
A. G. W. Foster
per F. A. Lehmann
att.

2 Sheets--Sheet 2.

A. G. W. FOSTER.
Meat-Tenderer.

No. 166,199. Patented Aug. 3, 1875.

WITNESSES.

INVENTOR.

UNITED STATES PATENT OFFICE.

ABRAHAM G. W. FOSTER, OF NEWNAN, GEORGIA.

IMPROVEMENT IN MEAT-TENDERERS.

Specification forming part of Letters Patent No. 166,199, dated August 3, 1875; application filed February 9, 1875.

*To all whom it may concern:*

Be it known that I, ABRAHAM G. W. FOSTER, of Newnan, in the county of Coweta and State of Georgia, have invented certain new and useful Improvements in Meat-Tenderers; and I do hereby declare the following to be a full, clear, and exact description of the invention, such as will enable others skilled in the art to which it pertains to make and use it, reference being had to the accompanying drawings, which form part of this specification.

My invention relates to an improvement in meat-tenderers; and consists in making in the bed-plate a series of conical holes, into which similarly-shaped projections on the under side of the lever enter, the said projections being sharp-pointed, and of such a size as to leave a space all around them when pressed down into the holes, as will be more fully described hereafter.

The accompanying drawings represent my invention.

Figure 1:
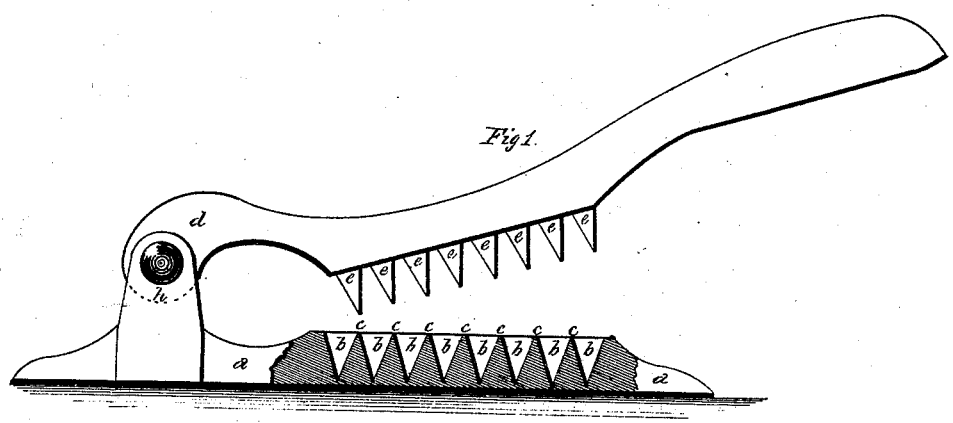
Figure 2:
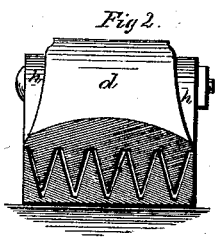
Figure 3:
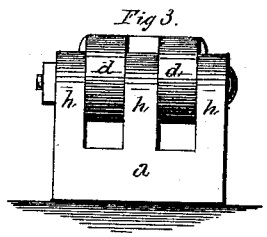
Figure 4:
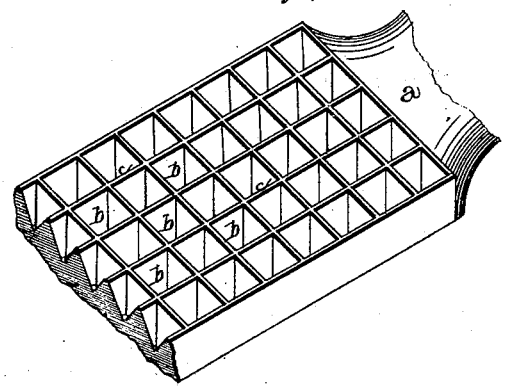

Figure 1 is a side elevation of my invention, partly in section. Fig. 2 is a vertical cross-section. Fig. 3 is an end view, showing the hinge. Fig. 4 is a perspective of the bed plate.

*a* represents a bed-plate, which is to be fastened to a table, and which has a series of cavities, *b*, square at the surface, the four sides narrowing downward until they unite at the bottom in a point. The walls *c*, between these cavities, are thin at the top, so as to allow a greater number of openings to be made in a given space, and also to cut or bruise the meat when pressed between the upper and lower plates. A strong hinge, *h*, attaches the upper plate *d* to the bed-plate, which upper plate may be moved back so as to give free access to the tenderer. Under the upper plate *d* is a series of pyramidal teeth or projections, *e*, so arranged as to enter, but not entirely to fill, the cavities *b* in the bed-plate when brought in contact with it. A handle, *g*, at the end of the plate *d*, serves to lift the plate, and also to press down firmly upon the meat, which is placed upon the cavities in the bed-plate.

The two plates *a* and *d* are formed in such a manner as to leave, when brought together, an open space between the tenderer proper and the hinge, to make room for the meat when pressed between the upper and lower plates; and in order to gain this open space, the upper plate is at this point bent upward, and the lower one is depressed. The meat, when the teeth are brought to bear upon it, is pressed down into the cavities, and then, between the sides of the teeth and the corresponding sides of the cavities, reduced to thin slices of a thickness equal to the difference between the cavities and the teeth. After changing the position of the meat a few times, and repeating the pressure, it will be found in a condition ready to be converted, by cooking, into a tender steak.

I am aware that tenderers consisting of a bed-plate and lever, each of which are provided with sharp-pointed projection, are old, and this I disclaim. I am also aware that a bed-plate and lever having ridged surfaces are not new, and this I disclaim.

By making the holes in the plate, and the projections on the lever enough smaller than the holes to leave a space all around them, the steak is cut and crushed in every portion as can be done by no other device.

Having thus described my invention, I claim—

The combination of the bed-plate *a*, having the conical recesses *b* and sharp-cutting edges *c*, with the lever provided with the sharp projections *e*, the projections being enough smaller than the recesses *b* to leave a space all around them, substantially as shown and described.

In testimony that I claim the foregoing, I have hereunto set my hand.

ABRAHAM G. W. FOSTER.

Witnesses:
S. G. JOHNSON,
P. G. MORROW.